United States Patent [19]

Jupin et al.

[11] Patent Number: 5,556,678
[45] Date of Patent: Sep. 17, 1996

[54] PLASTICS TUBE HEAD PROVIDED WITH A LINING HAVING A BARRIER EFFECT AND AN INTERNAL MEMBER WHICH CAN BE USED FOR THIS LINING

[75] Inventors: Alain Jupin, Sainte Menehould; Gerard Chapet, Paris, both of France

[73] Assignee: Cebal SA, Clichy, France

[21] Appl. No.: 792,608

[22] Filed: Nov. 15, 1991

[30] Foreign Application Priority Data

Jul. 25, 1991 [FR] France .................................. 91 09689

[51] Int. Cl.⁶ .................................................. B65D 23/02
[52] U.S. Cl. ................... 428/36.6; 428/36.7; 428/36.91; 428/474.9; 428/475.2; 428/475.8; 428/476.3; 428/483; 428/516; 428/518; 428/520; 215/12.2; 220/453; 220/468
[58] Field of Search ................... 428/36.6, 36.7, 428/36.91, 474.9, 475.2, 475.8, 476.3, 483, 516, 518, 520; 222/94, 107; 220/453, 468, 470; 215/12.2, 13.1

[56] References Cited

U.S. PATENT DOCUMENTS

| | | | |
|---|---|---|---|
| 4,132,331 | 1/1979 | Mägerle | 222/107 |
| 4,281,045 | 7/1981 | Sumi | 428/36.6 |
| 4,451,512 | 5/1984 | Yazaki | 428/36.6 |
| 4,505,951 | 3/1985 | Kennedy | 428/36.6 |
| 4,664,284 | 5/1987 | Mägerle | 222/107 |
| 4,797,244 | 1/1989 | Sauer | 215/12.2 |
| 4,977,004 | 12/1990 | Bettle, III | 428/36.7 |
| 5,045,369 | 9/1991 | Kobayashi | 220/453 |

FOREIGN PATENT DOCUMENTS

| | | |
|---|---|---|
| 0130239 | 1/1985 | European Pat. Off. . |
| 0135554 | 5/1989 | European Pat. Off. . |
| 457251 | 7/1968 | Switzerland . |

*Primary Examiner*—Ellis Robinson
*Assistant Examiner*—Timothy M. Speer
*Attorney, Agent, or Firm*—Dennison, Meserole, Pollack & Scheiner

[57] ABSTRACT

The invention relates to a tube head equipped with an internal lining having a barrier effect, the internal lining consists of a multi-layered polymeric element fixed by an external surface layer of the element to a plastics annular covering of the head, the element also has one or more polymeric layers having a barrier effect and a total thickness of between 0.008 and 0.05 mm and an internal surface layer of polyolefin or of polyester. The invention also relates to such thermoformed monobloc becoming the internal lining element. The invention is suitable for the production of numerous tubes.

8 Claims, 2 Drawing Sheets

PLASTICS TUBE HEAD PROVIDED WITH A LINING HAVING A BARRIER EFFECT AND AN INTERNAL MEMBER WHICH CAN BE USED FOR THIS LINING

The present invention relates to a tube head made of a first plastics material, equipped with an internal lining having a barrier effect, and to this lining which is itself produced separately.

The document EP-A-0130239 discloses a plastics tube head comprising a neck surmounting a substantially truncated cone-shaped shoulder, this head having an internal lining made, for example, of polyester which is friction welded inside this neck and this PE (polyethylene) shoulder which form an annular covering enclosing said lining and forming the exterior of the head. This internal lining is provided as a separate member or washer produced by moulding, its friction joint to the PE of the tube head having ends which open into the interior of the tube and are sensitive to the permeation of agents such as steam. And, in particular, it only has a slight barrier effect with respect to oxygen, scents or flavourings.

The applicants aimed to develop a continuous internal lining having a better barrier effect and preferably having improved bond with the exterior of the tube head.

STATEMENT OF THE INVENTION

The invention relates to a plastics tube head comprising a neck surmounting a substantially truncated cone-shaped shoulder, said head being equipped with an internal lining having a barrier effect continuously covering at least 80% of the internal height of said neck and at least 50% of the substantially truncated cone-shaped internal surface area of said shoulder, said lining being completely enclosed in an annular covering of a first plastics material constituting the exterior of said head, characterised in that said internal lining consists of a multi-layered polymeric element fixed by an external surface layer of said element to said annular covering, said element also comprising one or more polymeric layers having a barrier effect and a total thickness of between 0.008 and 0.05 mm and an internal surface layer having a thickness of 0.25 to 1.2 mm of polyolefin or of polyester.

The aforementioned internal lining is produced beforehand by hot forming, preferably by thermoforming with deformation and placement on a male tool or in a female tool by vacuum. The choice of the multi-layered blank deformed in this way under heat allows complete selection of the barrier layer or layers, the surface layers which are important for welding or annular covering of the head and for the resistance of the interior of the head to corrosive agents, and intermediate adhesive layers. The applicants' tests have shown that by carrying out thermoforming at the softening temperature of the surface layers, which are much thicker and have lower melting points than the barrier layers, monobloc members are obtained which can be used as an internal lining, either after the cutting of a top orifice corresponding to the orifice of the neck of the tube or after an overall or peripheral thinning operation replacing this cutting and preparing a lid which can easily be cut from the neck of the tube.

It is preferable to have a first plastics material of the same kind as the plastics material of the external surface layer of said monobloc member which becomes the internal lining, this layer then being welded to and in perfect continuity with the annular covering moulded round this lining.

It is also preferable, in the most general case and also in combination with the foregoing measure, for the plastics material of the internal surface layer, a polyolefin or a polyester, to be of the same kind as said first plastics material of the annular covering: this plastics material of the internal surface layer is then perfectly welded to the annular covering over the end faces of the internal covering. This is also preferable for the production of the monobloc internal lining member, the fact that the same plastics material is used for the two thick surface layers facilitating thermoforming and improving the quality of the surfaces obtained. Thermoforming can thus be carried out in the same softened state for the two surface layers of the blank.

When the first plastics material is of the same type as the plastics material of the external surface layer of the internal lining, the continuity of these plastics materials is perfect and it is difficult microscopically to distinguish a trace of their joint. On the other hand, the adhesive layer having a typical thickness of between 0.006 and 0.05 mm and covering a layer or the layer having a barrier effect and which is disposed next to said adhesive layer in said lining can be distinguished using an infrared microscope. Furthermore, this barrier layer can easily be distinguished from the adjacent layers.

When the plastics materials of said two surface layers and of said first plastics material are of the same kind it is preferable to utilise this internal lining fully and the flexibility of the production thereof which will be illustrated by the examples, by causing it to cover the entire truncated cone-shaped internal surface of the shoulder of the head and by extending it with a downwardly inclined annular end rim which comes or will come into the vicinity of the top of a multi-layered skirt having a barrier layer of the tube. In this respect, the joint between the head and the skirt of the tube can be produced either during direct moulding of the head onto the skirt or after separate moulding of the head which is then fixed to the skirt, for example by friction or "rotation" or by glueing.

Owing to this lower rim, the portions of the annular covering enclosing the lower end edge of this lower rim as well as the upper end edge of the lining flush with the internal rim of these edges can easily be stopped, avoiding an internal bead which will obstruct the progression of the pasty product contained in the tube. These flush stops are permitted since there are perfect welds at the internal surface of the tube at these points.

The internal lining can also comprise, as already mentioned, at the upper end of its portion covering the interior of the neck, a lid-shaped portion extending and obstructing it. It has been seen that this closure was obtained directly in the thermoforming of the lining member.

This lid-shaped portion preferably comprises peripheral thinning making it easier to cut or break by submergence in the tube, the cutting or breaking allowing an unthinned and unbroken tab to remain. The lid can also be thinned.

In the foregoing, the head of the tube according to the invention preferably has an internal lining having the following structure and composition:

thickness 0.5 to 2.5 mm at least 5 interconnected layers comprising:
  a) an internal surface layer and an external surface layer of the same kind as said first plastics material forming the exterior of the head, each having a thickness of between 0.25 and 1.2 mm and of one and the same plastics material from the group formed by PE, PP and PET;

b) one or more internal layers having a barrier effect and a total thickness of 0.008 to 0.05 mm, each layer being of one of the materials from the group formed by: EVOH, PVDC, PAN, PVDF, PA, modified PA, saran, MXD6(metaxylene diamine 6);

c) adhesive layers between all the preceding layers.

The invention also relates to the monobloc member which is used or can be used as an internal lining in the foregoing head according to any one of the variations considered.

This member essentially comprises an axial chimney surmounting a substantially truncated cone-shaped annular shoulder, the ratio $H/d_i$ of the total height of said member to the internal diameter of said chimney being between 1 and 2.5, characterised in that it has a thickness of between 0.5 and 2.5 mm and that its wall consists essentially of:

one respective internal surface layer and external surface layer, both of PE or PP or PET and each having a thickness of between 0.25 and 1.2 mm;

one or more internal layers having a barrier effect and a total thickness of 0.008 to 0.05 mm, each layer being of one of the materials from the group formed by: EVOH, PVDC, PAN, PVDF, PA, modified PA, saran, MXD6;

adhesive layers between all the layers.

This member can have its top end blocked by a lid-shaped transverse portion, this condition having been described with respect to the tube head.

In an even more typical manner, the annular shoulder of the monobloc member is extended by a downwardly inclined annular end rim which is preferably substantially axial, and the ratio of the internal diameter of this annular rim to the internal diameter of the chimney is between 2 and 3 whereas the internal diameter of said annular rim, close to the diameter of the skirt of the future tube produced with this member, is between 18 and 50 mm.

ADVANTAGES

The production of the monobloc member acting as a an internal lining, by thermoforming, allows great flexibility in the choice of the qualities and barrier effects Surprising adaptation of the multi-layered material having a barrier effect to impermeable fixing in a tube head Possibility of producing barrier linings with a lid Improvement in the quality of the internal surface of the tube head, owing to the impermeable welded joints.

DETAILED DESCRIPTION OF THE INVENTION

Figure 1:
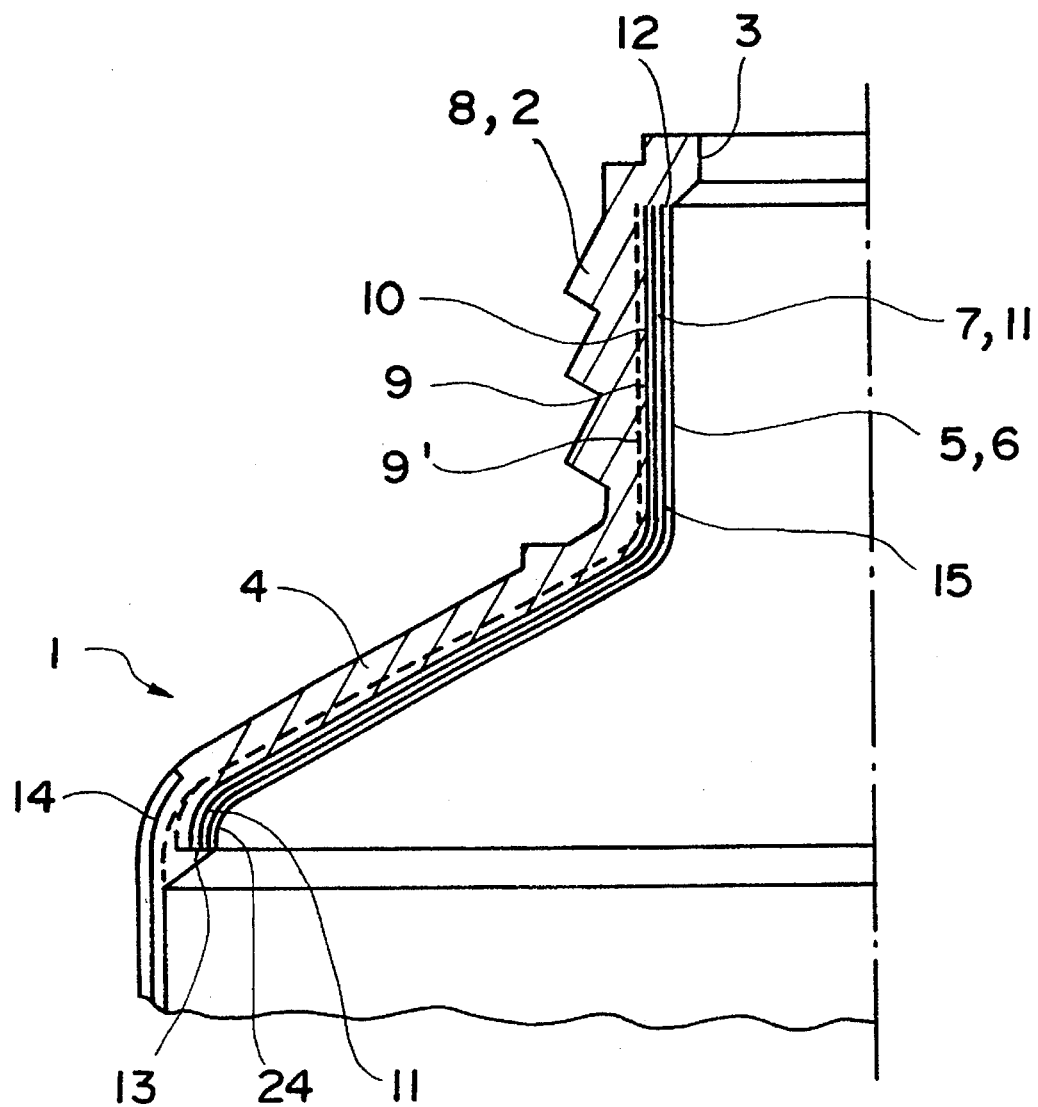
FIG. 1 shows a first tube head according to the invention in an axial half section.

FIG. 1 shows a tube head 1 having a neck 2 with an end orifice 3 having a diameter of 10 mm and a truncated cone-shaped shoulder 4 having an internal height of 5 mm and an internal base diameter of 25 mm. The height of the chimney 5 forming the interior of the neck is 10 mm, the lower 9 mm being formed by the internal surface layer 6 of the internal lining having a barrier effect 7 according to the invention. This surface layer 6, the annular covering 8 constituting the exterior of the tube 1 and the external surface layer 9 of the internal lining 7 are all three made of PE. The layer 9 is not distinguished from the covering 8 after moulding of the head, but the position of its surface just prior to moulding has been shown schematically in a broken line 9'.

Figure 2:
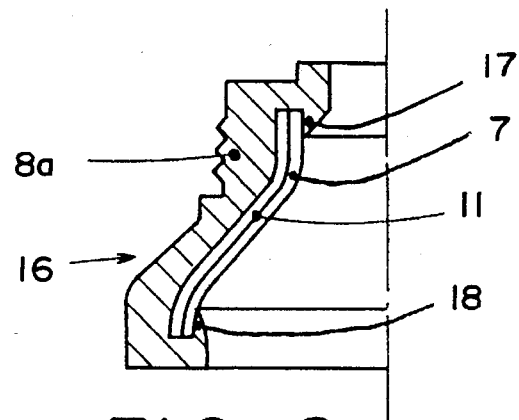
FIG. 2 shows, in part, a second tube head according to the invention in an axial half section.

The adhesive layer 10 connecting this layer 9 and the barrier layer 11 made of EVOH can be seen under an infrared microscope. The joint between the covering 8 and the internal surface layer 6 at the upper end edge 12 and lower end edge 13 of the internal lining 7 is a homogeneous PE weld, and the covering 8 does not form internal beads to hold the internal lining as in the prior art and as in the case shown in FIG. 2, because such beads are useless. It can be seen that the bottom of the barrier layer 11 is very close, at about 0.6 mm here, to the barrier layer 14 of the skirt on which the head 1 is moulded at the same time as on the lining 7 owing to the end rim 24 extending the truncated cone-shaped portion of the lining 7. This lining 7 has been prepared beforehand by thermoforming, as will be explained in Example 3. In this head 1, including its layer 9 of which the external limit 9' has disappeared, it has a thickness of 0.8 to 0.9 mm with 0.022 to 0.027 mm of EVOH barrier layer 11, two PE surface layers 6 and 9 of 0.38 mm each and two adhesive intermediate layers 10 and 15 having a thickness of 0.03 mm each in its centre.

2/EXAMPLE 2 (FIG. 2)

The case of an annular covering 80 made of PP is featured, the internal lining 7 being the same as in Example 1, only the barrier layer 11 being labelled. With a fixing in the head 16 by moulding completed by internal beads 17 and 18 trapping the internal lining 7, a distinction is made from the prior art by the quality of this internal lining 7 which provides its reinforced barrier effect over almost the entire height of the head. This head 16 is intended to be fixed on a skirt by glueing or by friction welding.

Figure 3:
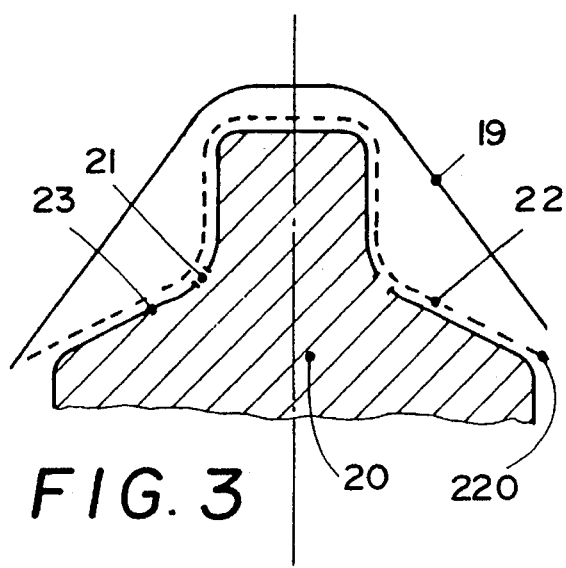
FIGS. 3 to 5 show schematically the stages in the production of a monobloc member for an internal lining by thermoforming.
Figure 6:
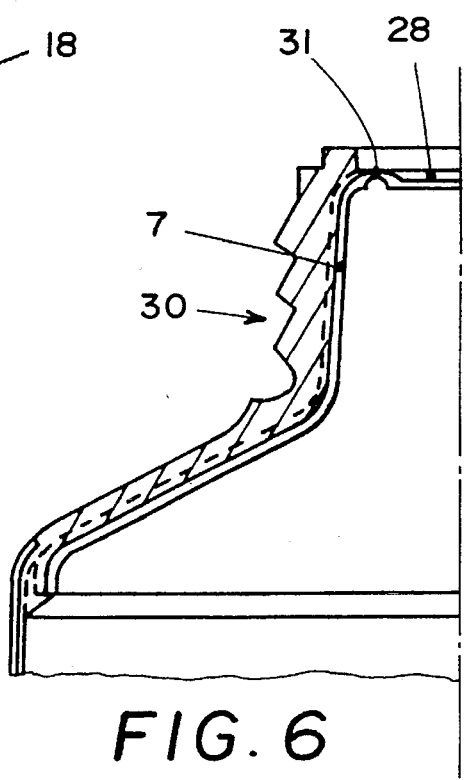
FIG. 6 shows a third tube head with lid.
Figure 4:
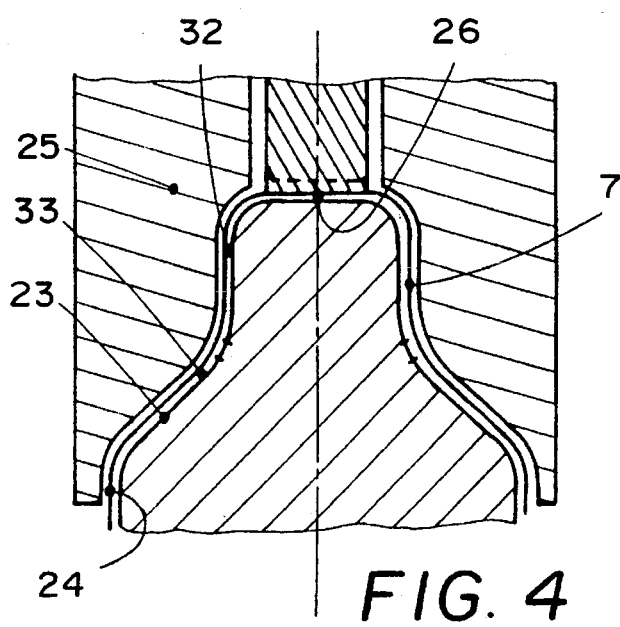
Figure 5:
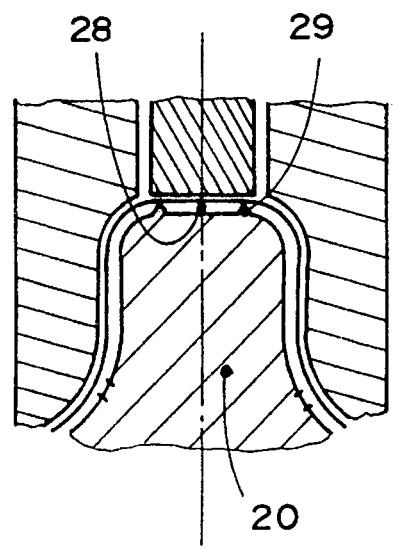

3/EXAMPLE 3 (FIGS. 3 to 5)

More than ten monobloc members identical to the internal lining 7 incorporated in the heads 1 and 16 have been prepared in the following manner:

the starting material was blank strip having a thickness of 1.28 mm comprising, from one face to the other:
0.58 mm of PE, then 0.04 mm of EAA, then 0.040 mm of EVOH, then 0.04 mm of EAA, then 0.58 mm of PE.

each portion of strip was heated to about 110° C., was preshaped to form an inverted bowl 19 above a male form or punch 20(FIG. 3) equipped with an aspiration system comprising orifices 21. The punch 20 had the form of the interior of the monobloc member 7 to be produced (FIG. 4). The form 19 was adjusted impermeably to the tools and was immediately subjected to the vacuum originating from the orifices 21, and it became deformed and applied itself to the die 20 according to the profile 22. This profile 22 was then smoothed by applying it with greater precision to the die 20 and its shoulder 23 and by folding along a downwardly inclined end rim 24, the periphery 220 of the profile 22 by means of a forming die 25. The end of this rim 24 was cut and shaping was completed by hot actuation of a circular blade cutting out a central orifice in the member 7 or of a compression tool thinning a central portion 26 of the head of the member 7 to a thickness of 0.3 to 0.4 mm so as to obtain a lid 28 which can easily be cut out or submerged. This thinning 30 can be total or can be peripheral, for example in line with a peripheral rib 29 on the head of the punch 20.

EXAMINATION AFTER FORMING

Thickness at the shoulder 32 of the member: 0.9 mm, and halfway up the shaft 33: 0.8 mm.

Thickness of EVOH: 0.022 to 0.025 mm at the shoulder 32, 0.027 mm halfway up the shaft 33 and in the non-compressed lid 28.

The deformation is uniform and there are not therefore any significant local variations in the barrier effect.

4/EXAMPLE 4 (FIG. 6)

A tube head 30 is equipped with an internal lining 7, the structure being identical to that in FIG. 1 (Example 1) with the exception of the lid 28 left at the top of the member 7. This lid 28 which is prepared by the method shown in FIG. 5 has 0.35 mm thick peripheral thinning 31, leaving a bridge or a tab which has a width of 3 mm and will hold this lid 28 when submerged in the neck of the tube.

INDUSTRIAL APPLICATION

The invention is applied to the production of tubes based on plastics materials and having skirt diameters of 18 to 50 mm, having an orifice with a diameter of 5 to 18 mm and containing pasty or creamy products to be used as foods, pharmaceuticals and cosmetics of which the flavouring or scent are to be conserved and which are to be protected from external oxygen. The internal lining according to the invention can also be used in a monobloc neck having a double skirt like the one described in EP-A-315554=U.S. Pat. No. 4,942,981, this lining therefore covering the internal surface of the external skirt of the neck.

What is claimed is:

1. A plastic tube head comprising a pre-formed internal laminate integrally molded to a unitary plastic neck and a plastic substantially truncated cone-shaped shoulder, said pre-formed internal laminate comprising at least three polymeric lamina, said at least three lamina comprising an exterior lamina and an interior lamina each having a thickness of between 0.25 to 1.2 mm and a low softening temperature, said exterior and interior lamina being selected from the group consisting of PE, P an PET, and an intermediate high softening temperature barrier effect lamina of between 0.008 to 0.05 mm thickness sandwiched between said exterior and interior lamina, said barrier effect lamina being selected from the group consisting of EVOH, PVDC, PAN, PVDF, PA, saran and metaxylene diamine 6, an pre-formed internal laminate lining at least 80% of the internal height of the neck and at least 50% of the substantially truncated cone-shaped shoulder with said exterior lamina embedded in said neck and shoulder and said interior lamina generally non-embedded in said neck and shoulder.

2. A tube head according to claim 1, in which said unitary neck and shoulder are formed of a material which is of the same kind as the material of said exterior lamina.

3. A tube head according to claim 2, in which said material of the interior lamina is of the same kind as the material of said material of said unitary neck and shoulder.

4. A tube head according to claim 3, in which said internal laminate having a barrier effect covers the entire truncated cone-shaped internal surface of said shoulder and is extended by a downwardly inclined end rim portion.

5. A tube head according to claim 2, in which a surface of said exterior lamina embedded in said unitary neck and shoulder includes an adhesive layer having a thickness of between 0.006 and 0.06 mm.

6. A tube head according to any one of claims 1 and 2 to 4, in which said internal laminate comprises, at the upper end of its portion covering the interior of said neck, a lid-shaped portion extending and blocking it.

7. A tube head according to claim 6, in which said lid-shaped portion comprises peripheral thinning facilitating the cutting out or breaking thereof by submergence in the tube.

8. A tube head according to any one of claim 1 and 2 to 5, in which said internal laminate has the following structure and composition:

thickness 0.5 to 2.5 mm at least 5 interconnected laminae comprising:
 a) interior and exterior laminae, each having a thickness of between 0.25 and 1.2 mm and of one and the same plastics material selected from the group consisting of PE, PP and PET;
 b) one or more barrier effect lamina with a total thickness of 0.008 to 0.5 mm, each of said one or more lamina being of one of the materials selected from the group consisting of EVOH, PVDC, PAN, PVDF, PA, modified PA, saran and MXD6; and
 c) adhesive layers between all the preceding laminae.

* * * * *